Figure 1:
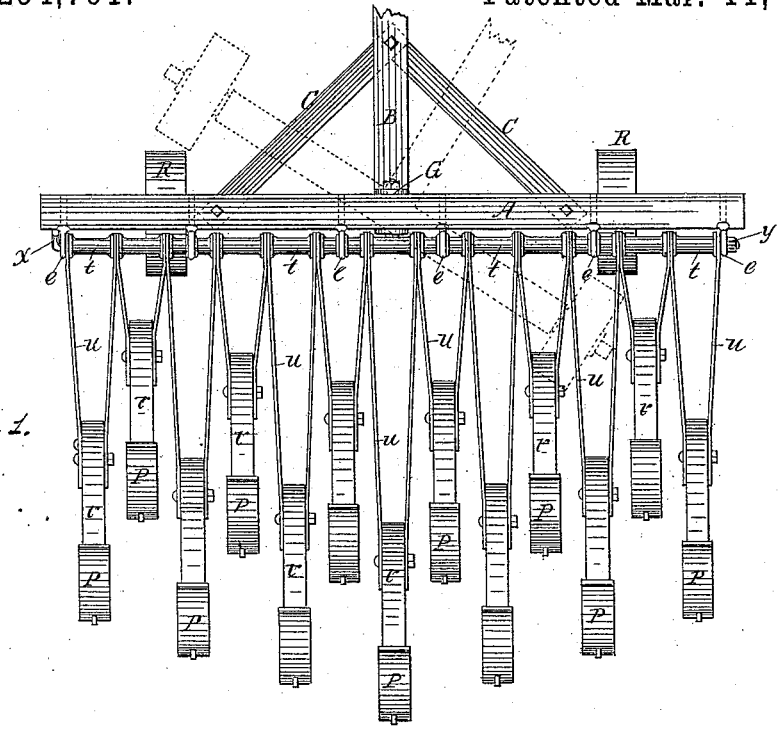

(No Model.) 2 Sheets—Sheet 1.

C. LA DOW.
SPRING TOOTH CULTIVATOR AND DRILL.

No. 294,791. Patented Mar. 11, 1884.

(No Model.) 2 Sheets—Sheet 2.
C. LA DOW.
SPRING TOOTH CULTIVATOR AND DRILL.
No. 294,791. Patented Mar. 11, 1884.
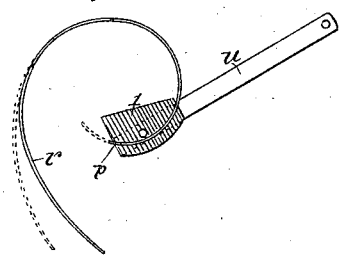
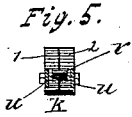
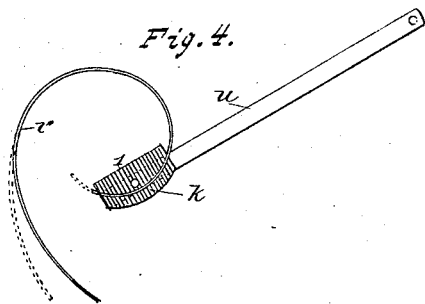
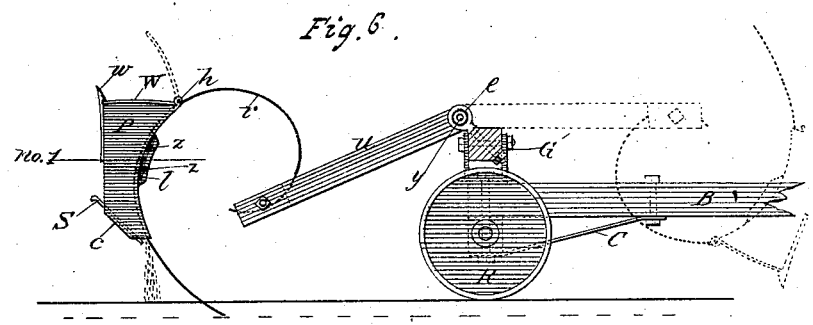
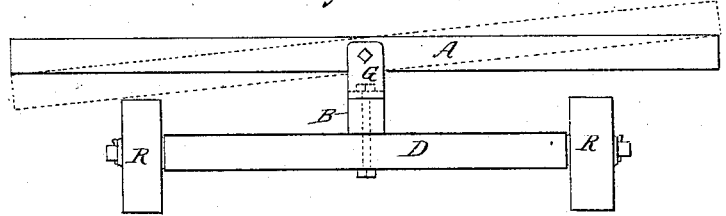
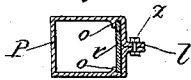
Witnesses:
C. C. Davidson
James Young
Chas. La Dow, Inventor.
by his attorneys
Baldwin, Hopkins, & Peyton.
N. PETERS, Photo-Lithographer, Washington, D. C.

UNITED STATES PATENT OFFICE.

CHARLES LA DOW, OF ALBANY, NEW YORK.

SPRING-TOOTH CULTIVATOR AND DRILL.

SPECIFICATION forming part of Letters Patent No. 294,791, dated March 11, 1884.

Application filed March 30, 1882. (No model.)

*To all whom it may concern:*

Be it known that I, CHARLES LA DOW, a citizen of the United States, residing in the city and county of Albany, and State of New York, have invented certain new and useful Improvements in Spring-Tooth Cultivators and Drills, of which the following is a specification.

My invention relates to that class of cultivators which employ vibratory spring-teeth for working the soil, and to seed-dropping devices for depositing the grain in regulated quantities in the furrows made by the passage of the teeth in such manner that the grain may be covered in drills by the earth moved by the teeth, or that the grain may be scattered broadcast, if desired.

The objects of my invention are as follows, viz:

First. To combine with a suitable draft-frame rising and falling drag-bars carrying sectional tooth-sockets, and teeth clamped by the sections of the sockets, so as to be capable of angular adjustment relatively to the bars, the sockets on the bars acting as shoes to regulate the cut of the teeth.

Second. To construct a drag-bar of two arms parallel with each other in a horizontal plane, arranged to brace against lateral thrust, and hinged at their forward ends to the draft-frame, and adapted to be drawn toward each other at their rear ends by means of a clamping-bolt, and to combine the said parts with a tooth-socket and a tooth formed with a bow above the plane of the rear end of the drag-bar, that rubbish, clods, or loose earth may slide up into the bosom of the tooth above the rear end of the drag-bar without raising it, the tooth being angularly-adjustable relatively to the drag-bar, so that the incline may be varied according to the rubbish encountered, that any variety of the same may readily work up from the point of the tooth without disturbing its action. This part of my invention can be accomplished with either rigid or spring teeth.

Third. To attach vibratory spring-teeth to a draft-frame by alternate long and short drag-bars, and to provide the short drag-bars with heavier tooth-sockets or castings than those used on the long drag-bars, that the heavier weighted short drag-bars may cause the teeth to enter the ground as deep as the long drag-bars.

Fourth. To mount a box for receiving and carrying grain on a vibratory spring-tooth in such a manner that the vibrations of the tooth caused by contact with the soil will agitate the grain and cause it to scatter as the implement proceeds.

Fifth. To provide the seed-carrying box with a regulating slide which shall govern the amount of grain scattered by the vibrations of the tooth.

Sixth. To attach the teeth to the draft-frame in such manner that they may be reversed thereon, and provide the seed-boxes with lids and spring-catches, which shall prevent the grain from being thrown out of the boxes when the teeth are reversed.

Seventh. To adjustably attach a seed-box to a vibratory spring-tooth in such a manner that the distance between the discharge-opening of said box and the point of the tooth may be either lessened or increased.

Eighth. To combine an adjustable seed-box with a vibratory spring-tooth, which can be set at various angles relatively to the ground in such manner that the two adjustments, being independent of each other, enable the grain to be deposited in a specified location, relatively to the tooth at whatever angle it may be set to enter the ground.

Ninth. To combine a seed-box with an independent drag-bar in such manner that the rear end of the drag-bar may be used as a runner or self-acting gage, which shall enable all the teeth to bury the seed at uniform depth while conforming to any unevenness of surface.

Figure 2:
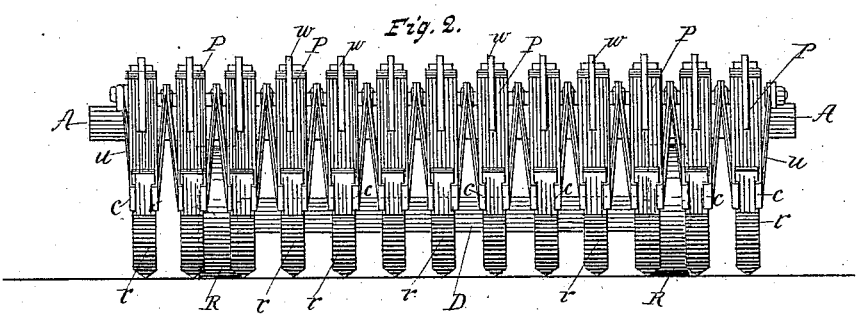

Referring to the drawings, Figure 1 represents a top view of my invention, showing by shaded lines the normal position of the truck-frame, draft-frame, drag-bars, spring-teeth, and seed-boxes, and showing by dotted lines the position of the truck-frame when the implement is being turned around. Fig. 2 represents a rear view of the seed-boxes and spring-teeth and the slides for regulating the discharge of grain from the seed-boxes. Fig. 3 represents a side view of one of the short drag-bars, its heavy casting for receiving the tooth, the spring-tooth mounted therein, and the bolt for clamping the parts together, also showing by dotted lines one of the positions to which the tooth may be adjusted. Fig. 4 represents a side view of one of the long drag-bars and the lighter socket-casting. Fig. 5 represents a rear end view of both straps of the drag-bar, the tooth-socket castings in two parts, the tooth mounted therein, and the bolt for clamping the parts together. Fig. 6 represents a side view of the implement, showing by shaded lines the normal position of the truck-frame, a draft-frame, a drag-bar, spring-tooth, and seed-box mounted thereon, and in the act of discharging grain, and showing by dotted lines the position of the drag-bar, tooth, and seed-box when reversed for transportation. Fig. 7 represents a rear view of the truck-frame and draft-frame, also showing by dotted lines that said frames may have vibratory movement independent of each other. Fig. 8 represents a top view of a section of one of the seed-boxes, also showing a portion of the tooth in cross-section and the method of adjustably clamping the seed-box to the tooth.

In the drawings, A is the draft-frame or cross-bar to which the drag-bars $u$ $u$ are hinged. B is the pole. C C are the braces. D is the axle. R R are the wheels. The pole, axle, braces, and wheels constitute the truck-frame.

The draft-frame A is attached to the pole of the truck-frame by means of a staple, G. This staple forms a double-hinged connection between the truck-frame and draft-frame, allowing the two frames to have vertical movement independent of each other through the medium of the horizontal pin passing through the staple G and draft-frame A, also allowing the truck-frame to be turned partially around independent of the draft-frame through the medium of the bolt passing vertically through the bottom of the staple G and through pole B and axle D. Each drag-bar is composed of two straps of iron pierced with holes at their forward ends for the reception of the rod $y$. These draw-bars are made long and short alternately, in order that the teeth may act on the soil in different planes across the line of draft, and be therefore less liable to clog.

$t$ $t$ are spacing-spools on rod $y$, and serve to keep the forward ends of the drag-bars at regulated distances apart on the rod $y$. Said rod $y$ is attached to the draft-frame by eye-bolts $e$ $e$, passing diagonally through said draft-frame, in order to cause the drag-bars to rest on the full surface of the upper side of the draft-frame, when they are reversed thereon for transportation. The rear end of each drag-bar is provided with a tooth-socket made in two parts for receiving the spring-teeth $r$ $r$. These sockets are recessed for the reception of the drag-bars, and also recessed for the reception of the spring-teeth. A clamping-bolt passes through the rear ends of the drag-bar and through the tooth-socket in cross-section, and permits the tooth to be moved in either direction in the socket, and, when the nut is tightened on said bolt, all of said parts are thereby firmly clamped together, and the tooth is securely held in any position to which it may be adjusted. When the drag-bar is reversed, it rests across the full surface of the upper side of the draft-frame, and therefore is not so liable to disfigure the same as it would be if it rested on one corner of said bar only. The draft-frame and truck-frame have vertical movement independent of each other, in order that when one of the wheels passes over an obstruction it may rise without changing the position of the draft-frame and the forward ends of the draw-bars. The pivotal connection of the frames permits the truck-frame to be readily turned around, making it much easier work for the team when turning corners.

The seed-boxes are adjustably clamped to the vibratory teeth, one box for each tooth. Their adjustability on the tooth permits them to be raised or lowered relatively to the ground and enables the seed to be deposited in any desired location relative to the tooth, the curved surface of the tooth and the adjustability of the box coacting to enable the grain to be so deposited that it may be covered with more or less earth, according to the position in which the box may be set on the tooth. As the tooth is drawn forward, it opens a furrow in the ground, and the action of the soil against the tooth causes the tooth to vibrate back and forth, and the grain, being arranged in the box against the rear surface of said tooth, is moved and discharged from the bottom of said box by the vibration of the tooth.

The discharge of the grain may be regulated in two ways—viz., first, by setting the frictional slide S in the grooved lips $c$ $c$, so as to increase or decrease the opening in the bottom of the box, second, by changing the angle of the tooth relatively to the ground, the rule being the greater the angle the more vibration the tooth will have, and consequently the opening in the bottom of the box will become larger or smaller and more seed will therefore be discharged than if less angle be given to the tooth. By either of these methods of adjustment the implement can be made to deposit as much or as small an amount of any kind of grain per acre as desired.

When the seed-box is adjusted and operated, as previously described, the grain will be deposited in the furrows made by the teeth and left in drills, the earth passing around the edges of the tooth and covering the grain. The grain may be sown broadcast by adjusting the seed-box on the tooth, so that the grain will fall on the curved back of the tooth, and by its vibrations will be scattered broadcast before it reaches the ground. If desired, the seed-boxes may be removed from either the long or short drag-bars, and in that case the drills will be made farther apart.

When the machine is to be used as a harrow, the seed-boxes may be taken off by loosening the bolt z, the ears l relieving the clamp of the sides of the seed-box o o from the edges of the tooth r sufficiently to permit the seed-box to slide down over the point of the tooth. The rod y is provided with a hook, x, at one end, and with a nut at the other. The hook is of sufficient length to strike the draft-frame and prevent the rod from turning around while the nut is being tightened or loosened. By tightening the nut on said rod the drag-bar and spools are clamped sufficiently to prevent lateral play of the drag-bars on the rod, but not tight enough to prevent their free vertical movement. Said clamping-nut may also be used to take up any wear of the end of the spools and forward ends of the draw-bars, and hold them tightly relatively to each other after continued use. The rod y can be drawn out of the spacing-spools and draw-bars by striking against the hook x, making a convenient means of detaching the draw-bars from the draft-frame.

The seed-box P may be made in two parts, if desired, and provided with clamping-ears (similar to those shown at l in Fig. 8) on opposite sides of said seed-box. The friction-slides S may be held by notches, or by a set-screw, or by any other convenient means; but I prefer to use the friction-grooves c c.

The draft-frame A may be dispensed with, and the rod y and its draw-bars may be applied directly to the axle D, and said axle may be made of any desired length, and as many teeth may be used as desired.

The teeth may be made to work the ground finer by removing the spacing-spools t t and substituting shorter ones, the draft-bars u u being sufficiently flexible to admit of being clamped to fit the ends of a spool much shorter than those shown in Fig. 1 of the drawings. When shorter spools are used, more draw-bars can be applied on the same length of rod y. The grooves in the outer sides of the tooth-sockets K K retain said sockets in their proper position on the drag-bars u u. The grooves in the inner sides of said tooth-sockets are made curved to conform to the shape of the tooth, and the tooth is held by frictional contact between said sockets and the edge of the tooth.

The teeth may be so adjusted in the sockets K K that said sockets will drag on the ground and act as runners for gaging the depth of penetration of the points of the teeth, and when the seed-boxes are applied to the teeth the runners may be used to gage the depth at which the seed shall be deposited and covered, the independent character of the drag-bars coacting with said runners and compelling all the teeth to deposit the seed at uniform depth, regardless of the inequalities of the surface.

If desired, the grain may be carried in one box, extending across the machine in any well known manner, and the teeth may be so arranged relatively to the box that the vibration of the teeth will agitate and discharge the grain; but I prefer a separate box for each tooth.

No claim is made herein to the organization involving, broadly, drag-bars, shoes, and teeth adjustable in the shoes to vary their depth of penetration, such matter being the subject of a division of this application, filed March 1, 1883, and serially numbered 86,695.

I claim as my invention—

1. In a cultivator, the combination of a draft-frame, rising-and-falling drag-bars attached thereto, sectional tooth-sockets on the ends of the drag-bars, and teeth clamped between the sections of said sockets, and capable of being angularly adjusted relatively to the drag-bars, the sockets on the drag-bars acting as shoes or runners to regulate the cut of the teeth.

2. The combination of the parallel bars u u, hinged to the draft-frame at their forward ends and adapted to be drawn toward each other at their rear ends, a tooth-socket placed between the ends of the bars, a curved tooth, substantially such as described, and capable of angular adjustment in the socket, and a clamping-bolt, which draws the ends of the bars together and clamps the tooth in its socket.

3. In a cultivator, the combination of a draft-frame, alternate long and short drag-bars attached to said draft-frame, teeth on the draft-bars, and weights, also constituting tooth-sockets on the draft-bars, adapted to enforce the cut of the teeth in proportion to the length of the drag-bars.

4. In a cultivator, the combination of a vibratory spring-tooth with a grain carrying and distributing box carried on the tooth, substantially as and for the purpose described.

5. The combination of a grain carrying and distributing-box and a vibratory spring-tooth, the vibrations of which act upon the grain in the box to regulate its discharge.

6. In a cultivator, the combination of a vibratory spring-tooth with a grain carrying and distributing box carried on the tooth, and with mechanism for regulating the discharge of the grain.

7. In a cultivator, the combination of the draft-frame, teeth hinged thereto and adapted to be reversed on the frame, grain-boxes mounted on the teeth, and mechanism for preventing the escape of the grain when the teeth are reversed, substantially as described.

8. The combination of a vibratory spring-tooth and a seed-box adjustably mounted thereon, substantially as and for the purpose described.

9. In a cultivator, a draft-frame, a spring-tooth attached thereto and capable of being set at different angles relatively to said draft-frame, in combination with a seed-box adjustably mounted on the tooth, substantially as and for the purpose described.

10. In a cultivator, the combination of a draft-frame, drag-bars attached thereto and adapted to conform to the inequalities of the surface, spring-teeth on the drag-bars, seed-boxes adapted to conform to the movement of the drag-bars, and mechanism for gaging the penetration of the teeth, substantially as described.

CHARLES LA DOW.

Witnesses:
RICHARD P. DUMARY,
M. H. LEE.